United States Patent Office 3,473,322
Patented Oct. 21, 1969

3,473,322
SUPERCHARGED INTERNAL COMBUSTION
PISTON ENGINE
Gottlieb Wolf, Winterthur, Switzerland, assignor to Sulzer Brothers Limited, Winterthur, Switzerland, a Swiss company
Filed Aug. 30, 1967, Ser. No. 664,408
Claims priority, application Switzerland, Sept. 9, 1966, 13,105/66
Int. Cl. F02b *41/10;* F01m *1/02*
U.S. Cl. 60—13                                8 Claims

ABSTRACT OF THE DISCLOSURE

A supercharged internal combustion piston engine having an exhaust-driven turbo compressor equipped with an auxiliary drive for supplying additional power to the turbo compressor is disclosed. The auxiliary drive comprises a hydraulic volumetric motor unit coupled directly to the drive shaft of the turbo compressor and a power driven hydraulic pump unit connected by suitable hydraulic conduits to the hydraulic motor unit and to a reservoir for hydraulic fluid. The direct connection between the drive shaft of the turbo compressor and the hydraulic motor unit may be permanent or releasable during operation, and the hydraulic fluid is advantageously the lubricating oil of the piston engine.

Background of the invention

Turbo supercharger units in internal combustion piston engines sometimes deliver insufficient combustion air to the engine in certain working ranges, for example under a partial load or a shock load of the engine. In such cases it is an advantage if additional driving power can be fed to the turbo compressor of the supercharger unit in order to supply additional air to the engine.

Conventional methods of supplying driving power to the turbo supercharger units have various disadvantages. The method first proposed, namely by way of toothed-wheel gearings connected, for example, to the crankshaft of the engine, is expensive and complicated because of the large transmission ratio and the high speeds of the shaft of the turbo supercharger unit. The same applies to all drives containing a transmission gearing between a separate drive motor and the shaft of the supercharger unit. It has not been possible thus far to drive the turbo supercharger units directly instead of through a transmission. Electric motors are unsuitable because of the high speeds of the supercharger units. Free-jet oil turbines of the Pelton wheel type have been tried, but foaming of the oil has prevented their use in practice.

Summary of the invention

The object of the invention is to provide an improved auxiliary drive for an internal combustion piston engine of the type described which is simple, inexpensive, and very reliable in operation. The improved auxiliary drive of my invention comprises a hydraulic volumetric motor unit coupled directly to the drive shaft of the turbo compressor of the supercharger unit, the hydraulic motor unit advantageously being of the hydraulic screw machine type which is able to run or operate at the high speeds of the turbo compressor. A power driven hydraulic pump unit is connected to the hydraulic motor unit and to the reservoir for hydraulic fluid by appropriate hydraulic conduits. The hydraulic conduits leading to and from the hydraulic motor unit are advantageously connected by a by-pass conduit provided with a pressure relief check valve which permits excess hydraulic fluid from the pump unit to by-pass the motor unit. Similarly, the hydraulic conduits leading to and from the hydraulic pump unit are advantageously connected by a by-pass conduit provided with a suction relief check valve which permits hydraulic fluid from the reservoir to by-pass the pump unit. Hydraulic fluid employed to operated the hydraulic motor unit is advantageously the lubricating oil of the piston engine.

The hydraulic motor unit can be permanently connected to the drive shaft of the turbo compressor in which case the moving parts of the motor unit always rotate at the same speed as the turbo compressor. Alternatively, a releasable coupling may be provided between the hydraulic motor unit and the turbo compressor, and this coupling may be released or disengaged when the turbo compressor does not require additional power from the hydraulic motor unit. Under the latter circumstances, wear of the moving parts of the motor unit is reduced.

Brief description of the drawings

My improvement in supercharged internal combustion engines will be more fully understood from the following description thereof in conjunction with the accompanying drawings of which.

Detailed description

Figure 1:
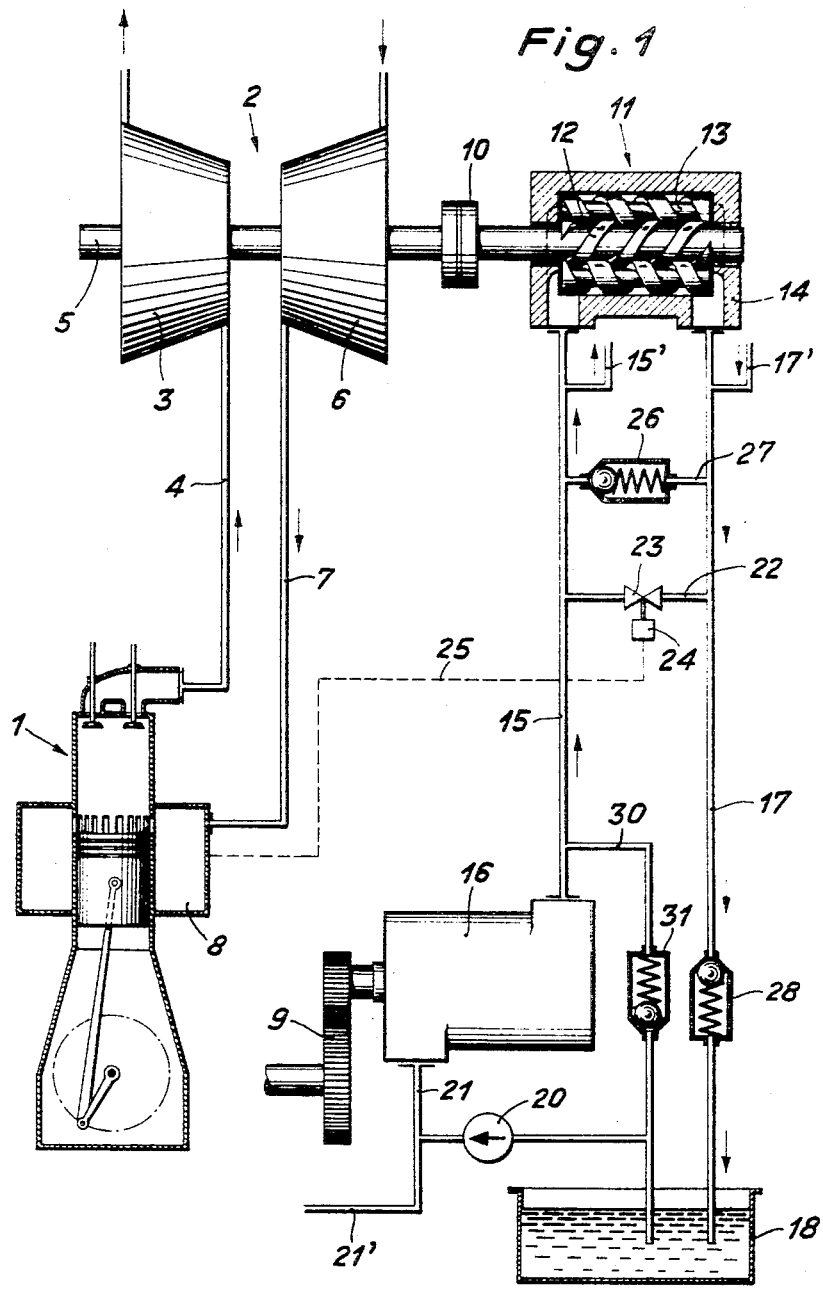
FIG. 1 is a diagrammatic representation, partly in section, of an internal combustion engine equipped with an advantageous embodiment of the improved auxiliary drive of my invention.

In the advantageous embodiment of my invention shown in FIG. 1 a longitudinally scavenged two-stroke internal combustion engine 1 is equipped with a turbo supercharger unit 2. The supercharger unit 2 comprises an exhaust-driven turbine 3 mounted on a drive shaft 5 in which shaft is also mounted a turbo compressor 6. The turbine 3 is driven by exhaust from the engine 1 delivered through the exhaust pipe 4, and compressed air from the turbo compressor 6 is delivered through the pipe 7 to an air reservoir 8 for the engine. An auxiliary drive for the turbo compressor 6 of the unit 2 is connected thereto by an clutch 10 located on one end of the drive shaft 5. The auxiliary drive comprises a hydraulic volumetric motor unit 11 which, as shown in FIG. 1, advantageously is a screw machine of the screw-pump type having parallel helical rotors 12, 13 housed in a casing 14. The hydraulic motor unit 11 is connected by a pressure line or conduit 15 to a high-pressure hydraulic pump unit 16 which may be of the same screw machine type as the motor unit 11. The pump unit 16 may be driven by the crankshaft of the engine 1 by means of a transmission 9, or it may instead be driven by a separate motor. The fluid-discharge outlet of the motor unit 11 is connected by way of a discharge line or conduit 17 to a tank or reservoir 18 for hydraulic fluid which, advantageously, is the lubricating oil for the piston engine 1. The fluid is drawn out of the reservoir 18 by a transfer pump 20 which is connected by conduit 21 to the high-pressure pump unit 16.

The pressure line or conduit 15 is connected to the discharge line or conduit 17 by a by-pass conduit 22 provided with a valve 23. The valve 23 is operated by a servo-motor 24 which in turn, operates in response to control signals received from the piston engine 1 or from a separate supercharger regulator device. By way of example, FIG. 1 of the drawing shows a signal line 25 which operates the valve 23 according to the pressure in the air reservoir 8 of the engine.

The discharge conduit 17 is provided with a spring-biased pressure-maintaining valve 28. The conduits 15 and 17 leading to and from the motor unit 11 are connected by a by-pass conduit 27 provided with a pressure relief valve 26 adjusted to prevent a dangerous pressure rise in the line 15. The conduits 21 and 15 leading to and from the pump unit 16 are connected by a by-pass conduit 30 provided with a suction relief valve 31 adjusted to prevent an undesirable drop in the pressure in the conduit 15. If the piston engine is equipped with a plurality of supercharger unit, the hydraulic motor units associated with them can be connected to branch lines 15' and 17'.

During operation of the engine the transfer pump 20 pumps oil out of the reservoir 18 and into the conduit 21. The high-pressure pump unit 16 draws the oil from this pressure line 21 and sends it along pressure conduit 15 into the motor unit 11 which, in turn, transmits mechanical energy to the shaft 5 by means of the clutch 10. The oil discharged from the motor unit returns to the reservoir 18 through the conduit 17 and the pressure-maintaining valve 28. Since the pressure-maintaining valve 28 keeps the whole system at a pressure above atmospheric pressure, foaming of the oil in the system and cavitation in the motor unit 11 are prevented or reduced. However, if there is no risk of this occurring, the valve 28 may be omitted, saving the energy required to overcome the resistance of this valve.

At low or moderate piston engine speeds the supercharger unit may deliver insufficient air to the air reservoir 8 unless additional power is supplied by the auxiliary drive. In this event, the by-pass valve 23 is closed to insure that all of the hydraulic fluid in the conduit 15 will be delivered to the motor unit 11. At higher outputs of the piston engine the supercharger unit 2 normally does not require an auxiliary drive because the air pressure in the air reservoir 8 is high enough. In this event, the valve 23 may be fully or partly opened in response to a signal from the signal line 25 so that a portion of the oil from the high-pressure pump unit 16 will flow through the conduits 22 and back into the reservoir 18. If, on the other hand, the quantity of hydraulic fluid flowing through the motor unit 11 is greater than that delivered by the high-pressure pump 16, the motor unit 11 acts as a pump and draws more oil through the conduit 30 and suction relief valve 31.

Depending on the design and dimensions of the high pressure pump 16 and hydraulic motor 11, the arrangement embodying the invention can operate in various ways. For example, if the pump 16 is large enough, the oil can be supplied to the hydraulic motor 11 continuously; in this case there would be no need of an additional flow through the conduit 30 or of a by-pass through conduit 22 and valve 23. Alternatively, the pump 16 can be designed for a low speed range only, and the hydraulic motor 11 can draw in or pump oil itself at higher speeds of the turbo supercharger unit.

The high-pressure pump 16 may be driven either by the crankshaft of the piston engine or by a separate motor, e.g., an electric motor. The separate motor may run at a constant or variable speed.

The clutch 10 may be a permanent coupling in which case the moving parts of the motor unit 11 rotate always at the same speed as the turbo compressor 6, or it may be of the type that can be released during operation of the piston engine. In the latter case the clutch 10 may be an over-running clutch which interrupts the operative connection between the motor unit 11 and the shaft 5 of the turbo supercharger unit as soon as the turbo compressor 6 reaches a higher speed than the motor unit 11. After the connection between the turbo compressor and the motor unit has been broken, the motor unit may continue to rotate freely or, for example, it may be brought to a stop or very slow idling by shutting off the drive to pump unit 16, or by opening the valve 23. Alternatively, the releasable coupling 10 may be a conventional electromagnetic coupling operated in response to a predetermined change in operating conditions of the piston engine or supercharger unit. For example, the electromagnetic coupling may be switched off when a certain pressure is reached in the engine air reservoir 8 or when a certain engine or supercharger speed is exceeded. Another alternative clutch 10 is a mechanically operated friction clutch which may be operated according to the values mentioned. Alternatively, the clutch 10 may be a hydraulic clutch, for example a fluid coupling which is filled or emptied as required. As already mentioned, the hydraulic motor 11 may be stopped or may run at full or at reduced speed when the clutch 10 is disengaged.

Figure 2:
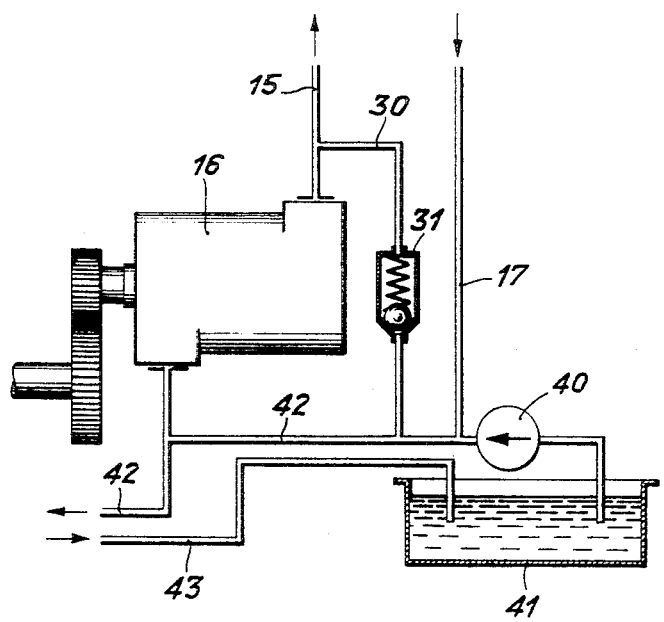
FIG. 2 is a diagrammatic representation of a modification of the embodiment of my invention shown in FIG. 1.

FIG. 2 shows a detail from FIG. 1 with an alternative arrangement of the hydraulic circuit for the pump 16 and motor unit 11. In this arrangement the transfer pump 40 is the lubricating-oil pump for the internal combustion piston engine that normally pumps oil from the lubricating-oil tank 41 to the lubricating points of the engine 1. The high-pressure pump 16 is connected to the engine lubrication piping 42 from which it withdraws oil at the normal lubricating pressure, i.e., at 3 to 6 atmospheres excess pressure. From the lubricating points in the internal combustion engine the oil flows along piping 43 back into the tank 41. The discharge conduit 17 from the motor unit 11 also leads to the lubricating piping 42. With this arrangement there is no need for a pressure-maintaining valve 28, since the counter pressure for the conduit 17 is provided by the lubricating pressure in the line 42. The pressure level in the hydraulic circuit leading through the pump unit 16 and motor unit 11 is increased by the discharge pressure of the pump 40, and this has advantages in the operation of the plant. For example, energy losses due to the need to overcome the back pressure of the valve 28 are avoided.

A similar result can be obtained in the embodiment in FIG. 1 by providing a transfer pump which delivers the hydraulic fluid to the reservoir 18 where it is kept at a pressure above atmospheric pressure. In this case the reservoir 18 must be a pressure tank. Alternatively, the embodiment in FIG. 1 may also use the ordinary engine lubricating oil pump as its transfer pump 20, in which case the lubricating points in the engine would be connected to a line 21'.

For simplicity's sake the drawings have only shown arrangements with one pump 16 and one hydraulic motor 11. However, when an internal combustion piston engine has a plurality of turbo supercharger units, one pump 16 can supply pressure oil to a plurality of hydraulic motors 11 associated with the various turbo supercharger units, as indicated in FIG. 1 by the lines 15' and 17'.

I claim:

1. In a supercharged internal combustion piston engine having at least one turbo compressor for supplying combustion air to the engine and an auxiliary drive for supplying combustion air to the engine and an auxiliary drive for supplying additional power to the turbo compressor, the improvement in which the auxiliary drive comprises a helical gear motor coupled directly to the drive shaft of the compressor and a power driven hydraulic pump unit connected by hydraulic conduits to the motor and to a reservoir for hydraulic fluid.

2. The piston engine according to claim 1 in which the hydraulic conduits leading to and from the motor are connected by a by-pass conduit provided with a pressure relief valve which permits excess hydraulic fluid from the pump unit to by-pass the motor.

3. The piston engine according to claim 1 in which the hydraulic conduits leading to and from the hydraulic pump unit are connected by a by-pass conduit provided with a suction relief valve which permits hydraulic fluid from the reservoir to by-pass the pump unit.

4. The piston engine according to claim 1 in which the hydraulic conduits leading to and from the motor are connected by a by-pass conduit provided with a motor-operated by-pass valve, said by-pass valve being opened and closed in response to control signals generated by predetermined changes in operating conditions of the piston engine.

5. The piston engine according to claim 1 in which the motor is connected to the shaft of the turbo compressor by a coupling which can be released during operation.

6. The piston engine according to claim 1 in which the hydraulic conduit leading from the hydraulic fluid reservoir to the hydraulic pump unit is provided with a fluid transfer pump.

7. The piston engine according to claim 6 in which the motor is connected to the lubrication system of the piston engine and in which the lubricating-oil pump for the engine serves as said transfer pump.

8. In a supercharged internal combustion piston engine having a lubricating-oil reservoir, a lubricating-oil pump, and at least one turbo compressor for supplying combustion air to the engine and an auxiliary drive for supplying additional power to the turbo compressor, the improvement in which the auxiliary drive comprises a hydraulic volumetric motor coupled to the drive shaft of the compressor, a hydraulic pump, and hydraulic conduits connecting the reservoir to the intake to the lubricating-oil pump, connecting the discharge from the lubricating-oil pump to the intake to the hydraulic pump, connecting the discharge from the hydraulic pump to the intake to the motor, and connecting the discharge from the motor to the discharge from the lubricating-oil pump.

References Cited

UNITED STATES PATENTS

| | | | |
|---|---|---|---|
| 996,169 | 6/1911 | Deventer | 91—84 |
| 1,575,987 | 3/1926 | Gilman | 91—84 |
| 2,968,914 | 1/1961 | Birmann | 60—13 |
| 2,984,985 | 5/1961 | MacMillin | 60—97 |
| 3,045,447 | 7/1962 | Wagenius | 91—84 |

FOREIGN PATENTS 488,396   7/1938   Great Britain.

CARLTON R. CROYLE, Primary Examiner
DOUGLAS HART, Assistant Examiner

PO-1050
(5/69)

UNITED STATES PATENT OFFICE
CERTIFICATE OF CORRECTION

Patent No. 3,473,322           Dated   October 21, 1969

Inventor(s)     Gottlieb Wolf

It is certified that error appears in the above-identified patent and that said Letters Patent are hereby corrected as shown below:

Column 2, line 5, for "operated" substitute --operate--;
         line 35, for "in" substitute --on--.
Column 4, lines 52 and 53, delete "combustion air to the engine and an auxiliary drive for supplying".

SIGNED AND
SEALED
JAN 20 1970

(SEAL)
Attest:

Edward M. Fletcher, Jr.
Attesting Officer

WILLIAM E. SCHUYLER, JR.
Commissioner of Patents